UNITED STATES PATENT OFFICE.

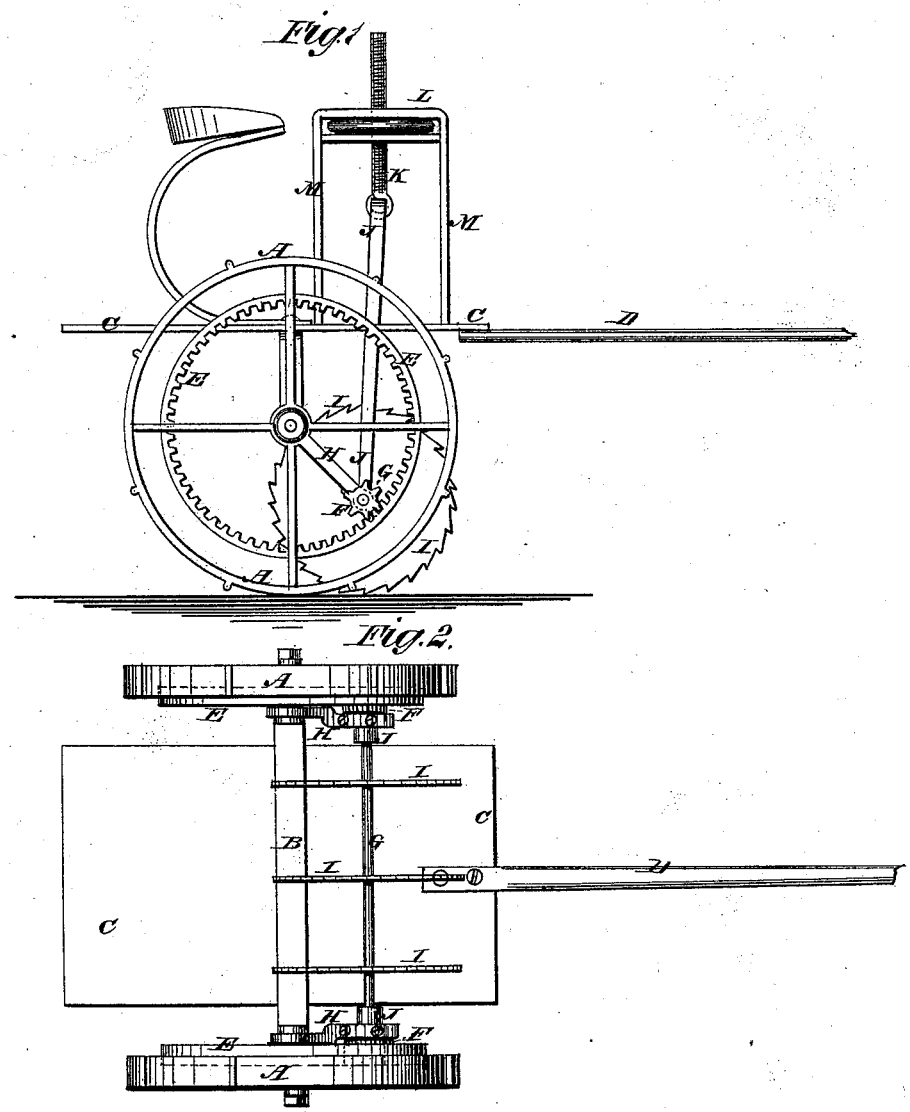

JAMES C. STONE, OF LEAVENWORTH, KANSAS.

IMPROVEMENT IN ROTARY CULTIVATORS.

Specification forming part of Letters Patent No. 176,897, dated May 2, 1876; application filed February 5, 1876.

*To all whom it may concern:*

Be it known that I, JAMES C. STONE, of Leavenworth city, in the county of Leavenworth and State of Kansas, have invented a new and useful Improvement in Saw-Plow, of which the following is a specification:

Figure 1 is a side view of my improved plow. Fig. 2 is an under-side view of the same.

Similar letters of reference indicate corresponding parts.

The object of this invention is to furnish an improved plow for use upon land free from stones and stumps, for preparing the land to receive seed, and for cultivating the plants, which shall be so constructed as to thoroughly stir up and pulverize the soil, destroying all the grass and weeds.

The invention consists in the combination of a series of circular saws and their shaft with the wheels, axle, and frame of a plow.

A are the wheels, which revolve upon the journals of the axle B. The axle B is bent four times at right angles to raise its middle part out of the way of its operating parts. To the middle part of the axle B is attached a platform or frame, C, which may be made so long that a drill or planter apparatus may be attached to it. D is the tongue, which is attached to the platform or frame C, or to the axle B, or to both. Upon the inner sides of the drive-wheel A are formed, or to them are attached internally, toothed gear-wheels E, into the teeth of which mesh the teeth of the small gear-wheels F, attached to the ends of the shaft G. The shaft G revolves in bearings in the outer ends of the arms H, the inner ends of which ride upon the journals of the axle B at the inner ends of the hubs of the wheels A, so as to keep the wheels F in gear with the wheels E, however much the shaft G may be raised. To the shaft G is attached a series of disks, I, having teeth similar to saw-teeth formed upon or attached to their edges, and which may have more or less set, as may be desired. The saws I may be placed upon the shaft G at a distance apart of three and a half inches, more or less, as may be desired, or as the character of the land to be operated upon may require. J is a bail, the arms of which pass down through or at the sides of the frame or platform C, and have holes in their ends, through which the shaft G passes. To the center of the bail J is pivoted the end of a screw, K, which passes up through a hand-nut, L, swiveled to a bracket, M, attached to the frame or platform C, so that by turning the said hand-nut the saws may be adjusted to enter the ground to any desired depth, or may be raised from the ground, as required. Any other suitable device may be used for adjusting the saws, as may be convenient.

The plow may be drawn by animal or steam power, as may be desired.

Having thus described my invention, I claim as new and desire to secure by Letters Patent—

The combination of a series of circular saws, I, and the shaft G with the wheels, axle, and frame of a plow, substantially as herein shown and described.

JAMES C. STONE.

Witnesses:
J. P. BAUSERMAN,
T. L. JOHNSON.